United States Patent [19]
Lukstas et al.

[11] Patent Number: 5,348,272
[45] Date of Patent: Sep. 20, 1994

[54] DAMPER WITH IMPROVED DRIVE SHAFT BEARING ASSEMBLY

[75] Inventors: Edward Lukstas, Windsor; Jeffrey S. Mann, Broad Brook, both of Conn.; Ronald J. Tenerowicz, Agawam, Mass.

[73] Assignee: Combustion Engineering, Inc., Windsor, Conn.

[21] Appl. No.: 40,765

[22] Filed: Mar. 31, 1993

[51] Int. Cl.$^5$ .................................................. F16K 41/00
[52] U.S. Cl. ...................................... 251/214; 251/305; 277/84; 384/147; 384/207
[58] Field of Search .................... 251/214, 305, 306; 277/84; 384/147, 207

[56] References Cited

U.S. PATENT DOCUMENTS

| | | | |
|---|---|---|---|
| 2,626,839 | 1/1953 | Creson et al. | 384/147 |
| 3,415,581 | 12/1968 | Seubert | 384/147 X |
| 3,883,112 | 5/1975 | Milleville et al. | 251/214 X |
| 3,979,104 | 9/1976 | LaCoste et al. | 251/214 |
| 3,988,000 | 10/1976 | Reese | 251/214 |
| 4,022,424 | 5/1977 | Davis et al. | 251/214 |
| 4,202,644 | 5/1980 | Soussloff | 403/369 |
| 4,406,441 | 9/1983 | Lukesch et al. | 251/214 |
| 4,595,206 | 1/1986 | Holzer | 277/84 |
| 4,938,452 | 7/1990 | Imamura et al. | 251/305 |
| 4,979,722 | 12/1990 | Totten | 384/147 X |

Primary Examiner—John Rivell
Attorney, Agent, or Firm—Robert S. Smith

[57] ABSTRACT

A damper assembly particularly adapted for use in a hot furnace application that includes a damper blade, a housing having a passageway therein dimensioned and configured for receiving the damper blade, and a shaft carrying the damper for rotational movement in the passageway in the housing. A bearing is disposed at one axial extremity of the shaft. The apparatus also includes bearings including a bearing housing member having an interior portion thereof which is spherical section shaped and a bearing member disposed therein having an outer surface that is a spherical section dimensioned and configured for cooperation with the inner portion of the bearing housing member. The inner members has a bore tightly engaging the shaft and the bore has inboard and outboard ends. The inner member includes a counterbore disposed in concentric relationship with the bore at the inboard end thereof. A seal is disposed in the counterbore intermediate the shaft and the walls of the counterbore. The apparatus also includes apparatus for supporting the bearing on one side of the passageway of the housing. In some forms of the invention the seal is spring loaded and in other forms it is elastomer loaded.

15 Claims, 2 Drawing Sheets

DAMPER WITH IMPROVED DRIVE SHAFT BEARING ASSEMBLY

BACKGROUND OF THE INVENTION

The present invention relates to damper mechanisms and, more particularly, to bearing assemblies for use in damper mechanisms. The invention has particular application to damper mechanisms used furnaces such as those used in vapor generation apparatus, The present invention may be used in dampers for controlling supplemental air flow into the fuel-air admission assemblies of such furnaces. It is a design requirement that the assembly of the present invention seal off the hot internal furnace gases and prevent them from passing to the outside of the furnace. A prior art design uses three separate concentric tubular members. The largest tubular member is a bearing housing that is fixed to the duct. The next largest tubular member is a sleeve or journal bearing that rotates in the bearing housing. The smallest tubular member is a gland nut that secures packing against the shaft on which the damper blade turns.

The packing seals off the internal gases and coal dust with a seal assembly like that used in the common stem faucet used in residential bathrooms. More particularly, a preformed packing, shaped something like a rope, is wrapped around the damper shaft and a packing or gland nut engages the bearing housing to compress the packing. A disadvantage of this procedure that it is difficult to adjust the gland nut to provide adequate sealing without increasing rotational fiction loading of the damper shaft.

Each of the parts of the prior art seal and bearing assembly must have very precise concentricity requirements. If the surfaces on the respective members are not precisely aligned ,a binding force is put on the shaft.

In the prior art design a damper shaft operating lever is attached to the shaft by drilling a hole through the shaft and a lever to permit insertion of a pin. If the lever is not properly located, the damper may not work properly. The relative position of the shaft and the lever is of vital significance for proper operation of the damper. Misalignments of even one-half of one degree may be a problem for some applications. For example, leakage through the damper may occur that will be objectionable.

OBJECTS AND SUMMARY OF THE INVENTION

It is a primary object of the invention to provide a shaft bearing and seal arrangement that is more reliable in operation than prior art devices.

Another object of the invention is to provide apparatus that is less costly in terms of both parts and labor.

Another object of the invention is to provide apparatus that has fewer parts than the prior art apparatus.

Still another object of the invention is to provide apparatus that allows precise location of the operating lever with respect to the damper.

Still another object of the invention is to provide apparatus that will provide a good seal while having minimum impact on the torque required to move the damper blade.

Yet another object of the invention is to provide apparatus that provides for self alignment of the seal.

It has now been found that these and other objects of the invention may be attained in a damper assembly that includes a damper blade, a housing having a passageway therein dimensioned and configured for receiving the damper blade, a shaft carrying the damper for rotational movement in the passageway in the housing, and a bearing disposed at one axial extremity of the shaft, The bearing includes a bearing housing member having an interior portion thereof which is spherical section shaped and an inner bearing member disposed therein having an outer surface that is spherical section dimensioned and configured for cooperation with the inner portion of the bearing housing member. Each of the inner members has a bore tightly engaging the shaft and each of the bores have inboard and outboard ends and includes a counterbore disposed in concentric relationship with the bore at the inboard ends thereof. A seal is disposed in the counterbore intermediate the shaft and the walls of the counterbore. The apparatus also includes means for supporting the bearing on one side of the passageway.

In some forms of the invention the seal is spring loaded and in other forms it is elastomer loaded. The seal may be a polymer seal disposed in the counterbores intermediate the shaft and the inner member.

The means for supporting the bearings may include an elongated sleeve shaped members having a flanged axial extremity. In some forms of the invention the apparatus may further include a mounting plate disposed on the housing proximate to the passageway in substantially perpendicular relationship to the axis of the shaft.

In some cases the apparatus further includes an actuator arm extending from and fixed to the shaft and a keyless bushing intermediate the actuator arm and the shaft.

BRIEF DESCRIPTION OF THE DRAWINGS

The invention will be better understood by reference to the accompanying drawing in which.

DESCRIPTION OF THE PREFERRED EMBODIMENTS

Although the present invention will be described in terms of a coal fired steam generator apparatus it will be understood that the apparatus has application to other furnace apparatus and other apparatus. Coal fired furnaces are typically provided with a plurality of ducts or pipes to direct pulverized coal that is burned in the furnace. The pulverized coal and primary air is typically directed to a plurality of fuel-air admission assemblies arrayed in respective vertically extending wind boxes. The wind boxes are disposed in one or more walls of the furnace. It is conventional to provide secondary air dampers at these fuel-air admission assemblies to control the amount of air in the combustion process.

Figure 1:
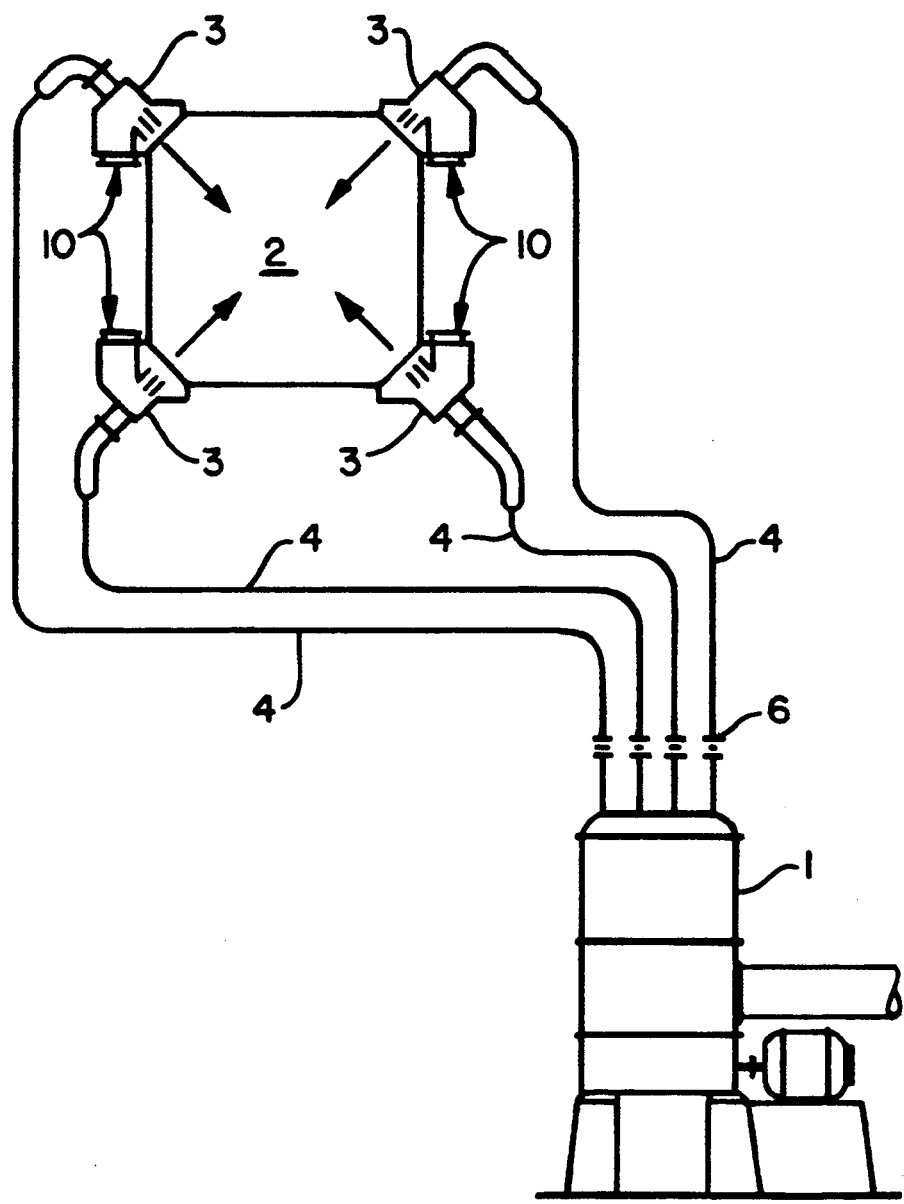
FIG. 1 is partially schematic view in elevation of a coal pulverizer connected to a plurality of fuel nozzles shown in plan view.
Figure 2:
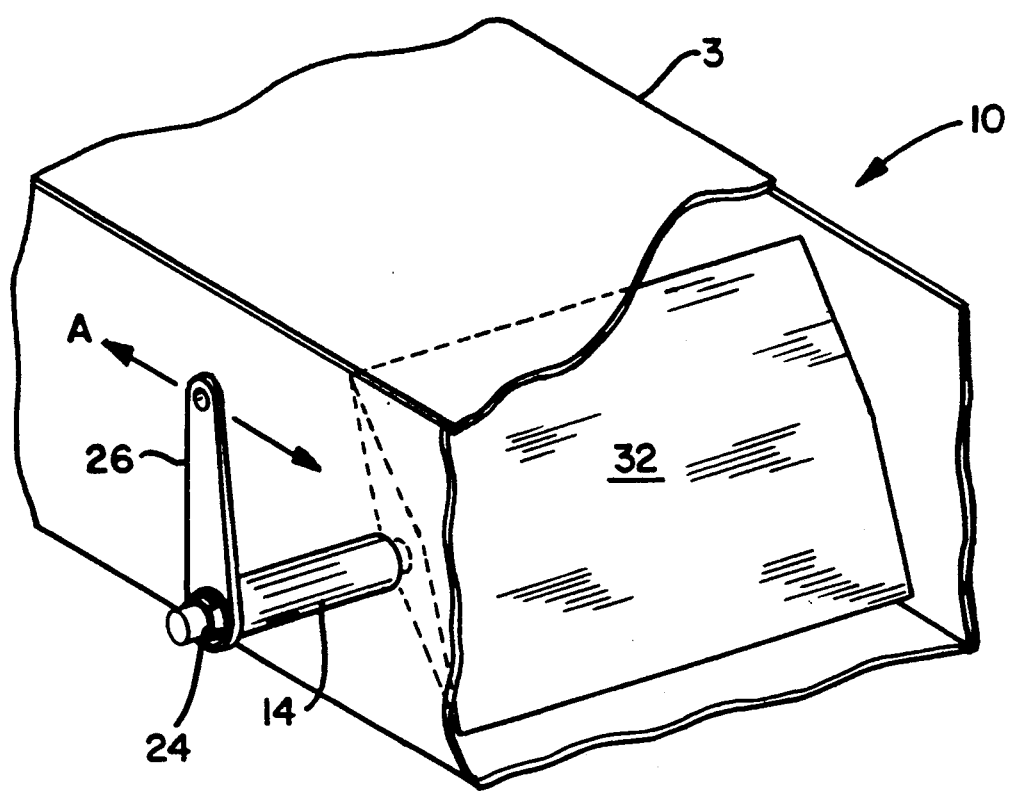
FIG. 2 is a simplified partly schematic perspective view of a duct in which is disposed a damper blade and a bearing and seal assembly in accordance with one form of the present invention.

One method of firing coal in conventional coal fired steam generator boilers is tangential firing. In this method, pulverized coal enters the furnace in a primary air stream through the fuel air admission assemblies. Each wind box comprises a vertical array of alternate secondary air compartments and fuel-air admission assemblies. The fuel air stream discharged from these fuel air admission assemblies is directed tangentially to an imaginary circle in the middle of the furnace. This creates a fireball that serves as a continuous source of ignition for the incoming coal. More specifically, a flame is established at one corner which in turns supplies ignition energy to stabilize the flame emanating from a corner downstream of and laterally adjacent Referring now to FIGS. 1–3 there is shown apparatus in which the present invention may be employed. The apparatus includes a coal pulverizer 1 that supplies pulverized coal to a furnace 2. The pulverized coal from the pulverizer 1 is ducted to the furnace 2 by means of respective ducts 4, 4, 4, 4. Each is provided with an orifice 6 to balance flow in the individual ducts. More specifically, the orifices insure that the flow is the same in each duct 4.

Supplemental air is supplied through wind boxes 3 disposed at the four corners of the furnace 2. Each wind box 3 includes a damper assembly 10 for control of primary air entering the furnace 2. The damper assembly 10 is disposed in one of the wind boxes 3.

Figure 3:
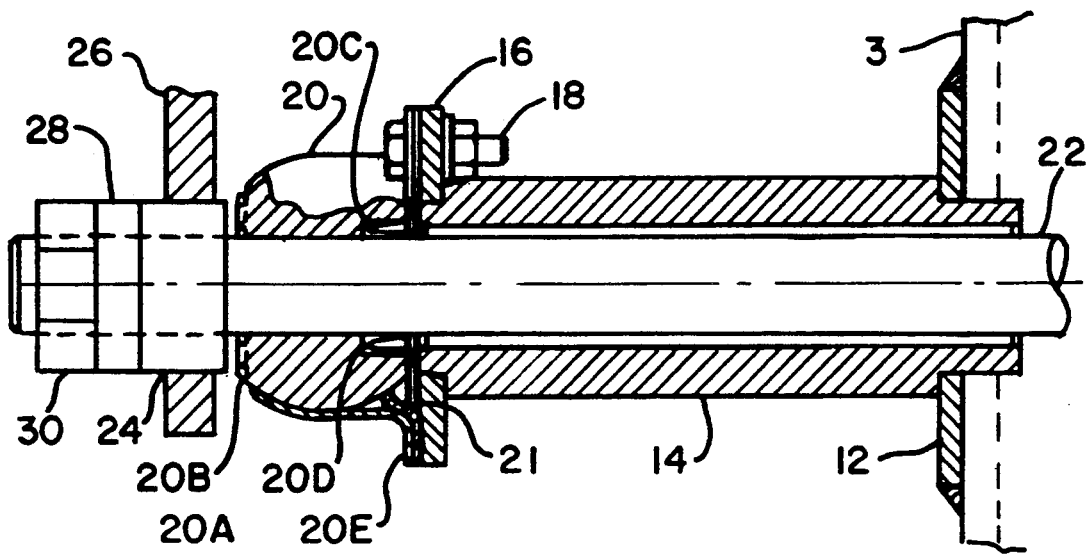
FIG. 3 is a vertical cross section extending through the center line of the damper shaft showing the bearing and seal assembly of FIG. 2 in greater detail.

As best seen in FIG. 3, a reinforcement plate 12 is disposed on the sidewall of the wind box 3 proximate to the location where the damper shaft assembly 10 extends through the wall thereof. An elongated housing 14 has a flange 16 at the left (as viewed) end thereof. A plurality of bolts 18 secure the flange 16 to a flanged self aligned bearing 20. In a customary manner the self aligning bearing has an outer shell 20A having an interior surface that is a cylindrical section which cooperates with an inner member 20B having an outer surface that is cylindrical section shaped and is dimensioned and configured for engagement with the inner surface of the outer shell 20A. A bore extends through the inner member 20B that is dimensioned and configured for engagement with the shaft 22. The bearing 20 must be capable of working in a high temperature environment and ordinarily the inner member will be at least partly graphite.

In the apparatus in accordance with the preferred form of the invention, the bearing material has a circular counterbore 20C in the right (as viewed) face thereof. (The right as viewed part of the counterbore 20C will be understood to be the inboard face because it is closer to the center of the elongated assembly.) A spring energized polymer seal 20D is inserted in the counterbore 20C. The spring energized or biased polymer seal such as that manufactured by The Advanced Products Company of North Haven, Conn. Such seals have a TFE jacket made resilient by an internal spring or expander of either metal or an elastomer. The metal expander or spring is preferred for most applications although the elastomer is an alternative. It has been found that seals of this general type are particularly effective in the harsh environment in which the present invention is utilized.

A gasket 21 is disposed intermediate the flange 16 of the housing 14 and the flange 20E that is part of the outer shell 20A. Preferably, the gasket 21 is manufactured of graphite. It will be seen that the gasket 21 provides a seal between the bearing 20 and the flange 16 that is welded to the housing 14.

Disposed on the shaft 22, adjacent to the spherical bearing 20, is a keyless bushing 24 such as that described in U.S. Pat. No. 4,202,644. Such bushings have the characteristic that an axial force distorts the body of the bushing so that the inside diameter thereof decreases and the outside diameter thereof increases. A particular advantage for the specific application shown in the present invention is that infinitely variable angular adjustment is possible between the shaft 22 and the actuator arm 26. Disposed axial adjacent to the bushing 24 is a spacer or washer 28. A conventional hexagonal nut 30 is carried on the threaded axial assembly of the shaft 22. It is this nut 30 that when turned by a wrench produces the axial force to lock the bushing between the shaft 22 and the arm 26.

The opposite axial extremity of the shaft 22 is supported by a conventional stainless steel bushing which, for simplicity, has not been shown. Another nut 30 or other abutment means is disposed on the other end of the shaft 22.

It will be seen by those skilled in the art that the tightening of the respective nuts 30 causes the deformation of the bushing 24 to fix the actuator arm 26 in place. Because the damper blade 32 is fixed to the shaft 22 it will be seen a force A is applied to the free end of the actuator arm 26 will rotate the shaft 22 and the damper blade 32.

Those skilled in the art will recognize that the apparatus in accordance with the present invention provides a positive seal to prevent escape of hot furnace gases and fly ash through the bearing assembly. Advantageously, the position of the actuating lever can be adjusted with respect to the shaft 22 to provide precise control.

The invention has been described with reference to its illustrated preferred embodiment. Persons skilled in the art of such devices may upon exposure to the teachings herein, conceive other variations. Such variations are deemed to be encompassed by the disclosure, the invention being delimited only by the following claims.

Having thus described our invention, we claim:

1. A damper assembly which comprises:
   a damper blade;
   a housing having a passageway therein dimensioned and configured for receiving said damper blade;
   a shaft carrying said damper for rotational movement in said passageway in said housing;
   a bearing disposed at a first axial extremity of said shaft, said bearing including a bearing housing member having an interior cavity therein which is spherical section shaped and a bearing member disposed in said cavity having an outer surface that is a spherical section dimensioned and configured for cooperation with said interior cavity of said bearing housing member, said bearing member having a bore tightly engaging said shaft, said bore having inboard and outboard ends, said inboard end including a counterbore disposed in concentric relationship with said shaft and said bore at the inboard end thereof;
   a loaded seal disposed in said counterbores intermediate said shaft and said bearing member; and
   means for supporting said bearing on one side of said passageway of said housing.

2. The apparatus as described in claim 1 wherein: said seal is loaded by a spring.

3. The apparatus as described in claim 2 wherein: said seal is a polymer seal.

4. The apparatus as described in claim 3 wherein:

said means for supporting said bearings includes an elongated sleeve shaped member having a flanged axial extremity.
5. The apparatus as described in claim 4 wherein:
said bearing has a flange mounting and said apparatus further includes a gasket intermediate said bearing and said flanged axial extremity.
6. The apparatus as described in claim 5 wherein:
said apparatus further includes a mounting plate disposed on said housing proximate to said passageway in substantially perpendicular relationship to said axis of said shaft.
7. The apparatus as described in claim 6 wherein:
said apparatus further includes an actuator arm extending from and fixed to said shaft.
8. The apparatus as described in claim 7 wherein:
said apparatus further includes a keyless bushing fixing said actuator arm to said shaft.
9. The apparatus as described in claim 1 wherein:
said seal is loaded by an elastomer.
10. The apparatus as described in claim 9 wherein:
said seal is a polymer seal.
11. The apparatus as described in claim 10 wherein:
said means for supporting said bearing includes an elongated sleeve shaped members having a flanged axial extremity.
12. The apparatus as described in claim 11 wherein:
said bearing has a flange mounting and said apparatus further includes a gasket intermediate said bearing and said flanged axial extremity.
13. The apparatus as described in claim 12 wherein:
said apparatus further includes a mounting plate disposed on said housing proximate to said passageway in substantially perpendicular relationship to said axis of said shaft.
14. The apparatus as described in claim 13 wherein:
said apparatus further includes an actuator arm extending from and fixed to said shaft.
15. The apparatus as described in claim 14 wherein:
said apparatus further includes a keyless bushing fixing said actuator arm to said shaft.

* * * * *